(12) United States Patent
Barthel et al.

(10) Patent No.: US 8,603,577 B2
(45) Date of Patent: Dec. 10, 2013

(54) METHOD FOR COATING WATER-ABSORBING POLYMER PARTICLES

(75) Inventors: Holger Barthel, Oftersheim (DE); Martin Wendker, Wentorf (DE); Reiner Witt, St. Leon-Rot (DE)

(73) Assignee: BASF SE, Ludwigshafen (DE)

( * ) Notice: Subject to any disclaimer, the term of this patent is extended or adjusted under 35 U.S.C. 154(b) by 1111 days.

(21) Appl. No.: 12/530,487

(22) PCT Filed: Mar. 17, 2008

(86) PCT No.: PCT/EP2008/053169
§ 371 (c)(1),
(2), (4) Date: Sep. 9, 2009

(87) PCT Pub. No.: WO2008/113788
PCT Pub. Date: Sep. 25, 2008

(65) Prior Publication Data
US 2010/0112200 A1    May 6, 2010

(30) Foreign Application Priority Data

Mar. 19, 2007 (EP) .................................. 07104407

(51) Int. Cl.
| | |
|---|---|
| *B05D 7/00* | (2006.01) |
| *B05D 3/02* | (2006.01) |
| *B01J 13/02* | (2006.01) |
| *C08G 75/02* | (2006.01) |
| *C08J 3/00* | (2006.01) |
| *C08F 6/00* | (2006.01) |
| *C08F 8/00* | (2006.01) |
| *C08L 83/00* | (2006.01) |
| *C08L 31/00* | (2006.01) |
| *B01F 5/06* | (2006.01) |

(52) U.S. Cl.
USPC .............. 427/212; 427/213.3; 427/213.31; 427/213.33; 427/213.34; 427/213.35; 427/213.36; 427/372.2; 427/384; 528/481; 528/480; 528/503; 525/326.1; 523/201; 523/315

(58) Field of Classification Search
None
See application file for complete search history.

(56) References Cited

U.S. PATENT DOCUMENTS

| | | | |
|---|---|---|---|
| 4,734,478 A | | 3/1988 | Tsubakimoto et al. |
| 5,369,148 A | * | 11/1994 | Takahashi et al. ............. 523/315 |
| 2003/0020199 A1 | * | 1/2003 | Kajikawa et al. ............. 264/140 |
| 2004/0240316 A1 | * | 12/2004 | Nogi et al. ..................... 366/348 |
| 2005/0043474 A1 | * | 2/2005 | Schmidt et al. ................ 524/556 |
| 2006/0025734 A1 | * | 2/2006 | Flohr et al. .................... 604/368 |
| 2006/0251826 A1 | * | 11/2006 | Pfeifer et al. ................. 427/558 |

FOREIGN PATENT DOCUMENTS

| | | |
|---|---|---|
| DE | 35 23 617 A1 | 1/1986 |
| DE | 102005032236 A1 | 1/2007 |
| JP | 05310806 A  * | 11/1993 |
| JP | 6339934 A | 12/1994 |
| JP | 2005060668 A  * | 3/2005 |
| WO | WO-9737695 A1 | 10/1997 |

OTHER PUBLICATIONS

Bodmeier et al.; Dry Polymer coating and Comparison with Conventional Liquid-Based Coatings for Eudragit; European Journal of Pharmaceutics and Biopharmaceutics; 2003.*
Buchholz, Fredric L., et al.. *Modern Superabsorbent Polymer Technology*, "Solution Polymerization: Unit Operations and Their Effect on Product Quality." New York: John Wiley & Sons, INc., 1998.
International Search Report in PCT/EP2008/053169 dated Sep. 3, 2009.

* cited by examiner

*Primary Examiner* — Guinever Gregorio
(74) *Attorney, Agent, or Firm* — Marshall, Gerstein & Borun LLP

(57) ABSTRACT

A process for preparing water-absorbing polymer particles by coating water-absorbing polymer particles with a particulate solid in a mixer, wherein the particulate solid is dispersed by means of a gas stream and the supply of the dispersed particulate solid in the mixer ends below the product bed surface.

20 Claims, No Drawings

METHOD FOR COATING WATER-ABSORBING POLYMER PARTICLES

CROSS-REFERENCE TO RELATED APPLICATIONS

This is the U.S. national phase of International Application No. PCT/EP2008/053169, filed Mar. 17, 2008, which claims the benefit of European patent application No. 07104407.7, filed Mar. 19, 2007.

The present invention relates to a process for preparing water-absorbing polymer particles by coating water-absorbing polymer particles with a particulate solid in a mixer, wherein the particulate solid is dispersed by means of a gas stream and the supply of the dispersed particulate solid in the mixer ends below the product bed surface.

The preparation of water-absorbing polymer particles is described in the monograph "Modern Superabsorbent Polymer Technology", F. L. Buchholz and A. T. Graham, Wiley-VCH, 1998, pages 71 to 103.

Being products which absorb aqueous solutions, water-absorbing polymers are used to produce diapers, tampons, sanitary napkins and other hygiene articles, but also as a water-retaining agent in market gardening.

The properties of the water-absorbing polymers can be adjusted via the degree of crosslinking. With increasing degree of crosslinking, the gel strength rises and the centrifuge retention capacity (CRC) falls.

To improve the use properties, for example permeability of the swollen gel bed (SFC) in the diaper and absorbency under load (AUL0.9 psi), water-absorbing polymer particles are generally postcrosslinked. This increases only the degree of crosslinking of the particle surface, which allows absorbency under load (AUL0.9 psi) and centrifuge retention capacity (CRC) to be at least partly decoupled. This postcrosslinking can be performed in the aqueous gel phase. However, dried, ground and screened-off polymer particles (base polymer) are preferably coated with a postcrosslinker on the surface, thermally crosslinked and dried. Crosslinkers suitable for this purpose are compounds which comprise at least two groups which can form covalent bonds with the carboxylate groups of the water-absorbing polymers.

Under a moist atmosphere, water-absorbing polymer particles form lumps and lose their free flow. Flow assistants can counteract this lump formation. The use of finely divided silicon dioxide such as Aerosil® 200 as a flow assistant for water-absorbing polymer particles has been known for some time, for example from DE 35 23 617 A1.

The use of finely divided silicon dioxide leads to increased dust nuisance. There has therefore been no lack of attempts to bind finely divided silicon dioxide, for example described in JP 63-39934, or to replace finely divided silicon dioxide by other flow assistants, for example described in WO 97/37695 A1.

DE 10 2005 032 236 A1 describes a process for coating particles, for example powder coatings, with finely divided particles, for example finely divided silicon dioxide. The finely divided particles are deagglomerated by means of a gas stream. The resulting aerosol can be passed repeatedly through a bed of the particles to be coated to improve the deposition.

It was an object of the present invention to provide an improved process for coating water-absorbing polymer particles with particulate solids.

It was a further object to find an efficient and low dust coating process.

It was a further object of the invention to provide a process for producing water-absorbing polymer particles with a minimum tendency to form lumps and high flowability, especially after storage in a moist atmosphere.

The object is achieved by a process for producing water-absorbing polymer particles by polymerizing a monomer solution or suspension comprising
 a) at least one ethylenically unsaturated acid-bearing monomer which may be at least partly neutralized,
 b) at least one crosslinker,
 c) optionally one or more ethylenically and/or allylically unsaturated monomers copolymerizable with the monomers specified under a) and
 d) optionally one or more water-soluble polymers, comprising drying, grinding and classifying, water-absorbing polymer particles being coated with a particulate solid in a mixer, wherein the particulate solid is dispersed by means of a gas stream and the supply of the dispersed particulate solid in the mixer ends below the product bed surface.

The product bed surface is the interface which is established between the water-absorbing polymer particles moved within the mixer and the atmosphere above.

The dispersed particulate solid is metered as an aerosol into the moving polymer particle layer below the product bed surface, i.e. the supply is immersed in the product bed, preferably by at least 10 mm, more preferably at least 50 mm and most preferably at least 100 mm.

The process according to the invention preferably comprises at least one postcrosslinking. In a particularly preferred embodiment of the present invention, postcrosslinked polymer particles are coated with particulate solids.

The ratio of mass flow of particulate solid to the gas mass flow used for dispersion (dispersion gas mass flow) is preferably at least 0.05, more preferably at least 0.1 and most preferably at least 0.2. Higher ratios (loadings) allow the consumption of dispersion gas to be lowered. Loadings above 1 lead to non-steady operating states in the dispersion and are therefore less preferred.

The mean particle diameter of the water-absorbing polymer particles is at least 200 μm, more preferably from 250 to 600 μm, most preferably from 300 to 500 μm, the particle diameter being determinable by light scattering and meaning the volume-average mean diameter.

The mean particle diameter of the particulate solid is less than 50 μm, more preferably from 1 to 20 μm, very particularly from 5 to 10 μm, the particle diameter being determinable by light scattering and meaning the volume-average mean diameter.

The supply typically has a circular cross section.

The process according to the invention is not prone to disruption and is therefore particularly suitable for continuous mixers.

The fill level of the mixer is preferably from 30 to 80%, more preferably from 40 to 75%, most preferably from 50 to 70%.

Too high a water content increases the agglomeration tendency of the water-absorbing polymer particles. The water content of the water-absorbing polymer particles to be used in the process according to the invention is therefore preferably less than 20% by weight, more preferably less than 10% by weight, most preferably less than 1% by weight.

The temperature of the water-absorbing polymer particles is preferably from 40 to 80° C., more preferably from 45 to 75° C., most preferably from 50 to 70° C.

In a preferred embodiment of the present invention, the particulate solid is dispersed by means of an annular gap injector.

An annular gap injector consists of an inner tube and an annular gap surrounding the inner tube. The width of the annular gap is typically adjustable. The particulate solid is, for example by means of a conveying screw, metered into the inner tube. The dispersion gas is supplied via the annular gap. The pressure drop at the annular gap accelerates the dispersion gas and generates a reduced pressure. The pressure drop can be adjusted via the dispersion gas mass flow and the gap width and is preferably from 0.5 to 8 bar, more preferably from 1 to 6 bar, most preferably from 1.5 to 5 bar. As a result of the reduced pressure, particulate solid and gas (bypass gas) are sucked in through the inner tube. At the same time, the particulate solid is dispersed in the gas stream. The aerosol thus obtained can be conducted below the product bed surface by means of a tube (lance), preferably having the diameter of the inner tube.

It is also possible to meter the dispersion gas through the inner tube and the particulate solid through the annular gap. Owing to the increased risk of blockage, this variant is, though, less preferred.

According to the type and amount of the particulate solid used, mixer, annular gap injector and lance can be adjusted relative to one another in their embodiment and size and also their operating conditions. Depending on the amount of dispersion gas supplied, a cavity forms upstream of the lance. The larger the cavity which forms, the more surface area delimiting the cavity is available for the direct coating with the particulate solid. The more rapidly the surface area delimiting the cavity is exchanged by the mixing process, the more water-absorbing polymer particles can be coated per unit time. Moreover, a minimum area of the mixer tools should be coated. The lances are therefore preferably arranged axially between the mixing tools. The preferred minimum distance between the exit orifice of the lances and the mixer wall or shaft depends on the density of the product bed. This is influenced significantly by the operating state of the mixer. The distance between the exit orifice of the lances and the mixer wall or shaft is preferably at least 50 mm, more preferably at least 100 mm, most preferably at least 200 mm. In the case of smaller mixers, smaller distances are selected than in the case of larger mixers.

Examples of parameters for the coating with fumed silica and/or precipitated silica to be used with preference by means of a lance with an internal diameter of from 25 to 30 mm are a dispersion gas mass flow of preferably from 2 to 70 kg/h, more preferably from 3 to 50 kg/h, most preferably from 3.5 to 35 kg/h, bypass gas mass flow of preferably from 5 to 70 kg/h, more preferably from 10 to 50 kg/h, most preferably from 15 to 25 kg/h, and a mass flow of particulate solid of preferably from 0.5 to 120 kg/h, more preferably from 2 to 60 kg/h, most preferably from 4 to 40 kg/h.

In the process according to the invention, it is possible to use all mixers known to those skilled in the art. The liquid can be sprayed on either in high-speed mixers or in mixers with low stirrer speed. Preference is given to using mixers with moving mixing tools, such as screw mixers, disk mixers, plowshare mixers, paddle mixers, screw belt mixers, Schugi mixers and continuous flow mixers.

Mixers with rotating mixing tools are divided into vertical mixers and horizontal mixers according to the position of the axis of rotation. The use of horizontal mixers is preferred. A particularly preferred horizontal mixer is the continuous flow mixer.

The residence time in the horizontal mixer is preferably from 1 to 180 minutes, more preferably from 2 to 60 minutes, most preferably from 5 to 20 minutes.

The peripheral speed of the mixing tools in the horizontal mixer is preferably from 0.1 to 10 m/s, more preferably from 0.5 to 5 m/s, most preferably from 0.75 to 2.5 m/s.

The water-absorbing polymer particles are moved in the horizontal mixer with a speed which corresponds to a Froude number of preferably from 0.01 to 6, more preferably from 0.05 to 3, most preferably from 0.1 to 0.7.

For mixers with horizontally mounted mixing tools, the Froude number is defined as follows:

$$Fr = \frac{\omega^2 r}{g}$$

where r: radius of the mixing tool

ω: circular frequency g: acceleration due to gravity

In the horizontal mixer, the angle between the mixer axis and the supply is preferably approx. 90°. The dispersed particulate solid can be supplied vertically from the top. Supply at an oblique angle from the side is likewise possible, in which case the angle relative to the vertical is preferably between 60 and 90°, more preferably between 70 and 85°, most preferably between 75 and 82.5°. The oblique arrangement of the supply enables the use of shorter supply lines and hence lower mechanical stresses during the operation of the mixer.

In a particularly preferred embodiment, the supply ends below the axis of rotation and meters in the direction of rotation. As a result of this arrangement, the coated water-absorbing polymer particles are conveyed away from the supply in an optimal manner. In combination with the oblique arrangement, it is also possible to exchange the supply during the operation of the mixer without the product being discharged.

Suitable particulate solids are, for example, inorganic inert substances such as fumed silicas and/or precipitated silicas.

The monomers a) are preferably water-soluble, i.e. the solubility in water at 23° C. is typically at least 1 g/100 g of water, preferably at least 5 g/100 g of water, more preferably at least 25 g/100 g of water, most preferably at least 50 g/100 g of water, and preferably have at least one acid group each.

Suitable monomers a) are, for example, ethylenically unsaturated carboxylic acids such as acrylic acid, methacrylic acid, maleic acid, fumaric acid and itaconic acid. Particularly preferred monomers are acrylic acid and methacrylic acid. Very particular preference is given to acrylic acid.

The proportion of acrylic acid and/or salts thereof in the total amount of monomers a) is preferably at least 50 mol %, more preferably at least 90 mol %, most preferably at least 95 mol %.

The monomers a), especially acrylic acid, comprise preferably up to 0.025% by weight of a hydroquinone monoether. Preferred hydroquinone monoethers are hydroquinone monomethyl ether (MEHQ) and/or tocopherols.

Tocopherol is understood to mean compounds of the following formula where $R^1$ is hydrogen or methyl, $R^2$ is hydrogen or methyl, $R^3$ is hydrogen or methyl, and $R^4$ is hydrogen or an acyl radical having from 1 to 20 carbon atoms.

Preferred radicals for $R^4$ are acetyl, ascorbyl, succinyl, nicotinyl and other physiologically compatible carboxylic acids. The carboxylic acids may be mono-, di- or tricarboxylic acids.

Preference is given to alpha-tocopherol where $R^1=R^2=R^3=$methyl, in particular racemic alpha-tocopherol. $R^1$ is more preferably hydrogen or acetyl. RRR-alpha-tocopherol is especially preferred.

The monomer solution comprises preferably at most 130 ppm by weight, more preferably at most 70 ppm by weight, preferably at least 10 ppm by weight, more preferably at least 30 ppm by weight, in particular around 50 ppm by weight, of hydroquinone monoether, based in each case on acrylic acid, acrylic acid salts also being considered as acrylic acid. For example, the monomer solution can be prepared by using acrylic acid having an appropriate content of hydroquinone monoether.

Crosslinkers b) are compounds having at least two polymerizable groups which can be polymerized by a free-radical mechanism into the polymer network. Suitable crosslinkers b) are, for example, ethylene glycol dimethacrylate, diethylene glycol diacrylate, allyl methacrylate, trimethylolpropane triacrylate, triallylamine, tetraallyloxyethane, as described in EP 530 438 A1, di- and triacrylates, as described in EP 547 847 A1, EP 559 476 A1, EP 632 068 A1, WO 93/21237 A1, WO 2003/104299 A1, WO 2003/104300 A1, WO 2003/104301 A1 and in DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/32962 A2.

Suitable crosslinkers b) are in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate or ethylene glycol dimethacrylate, and also trimethylolpropane triacrylate and allyl compounds such as allyl (meth)acrylate, thrallyl cyanurate, diallyl maleate, polyallyl esters, tetraallyloxyethane, triallylamine, tetraallylethylenediamine, allyl esters of phosphoric acid and vinylphosphonic acid derivatives, as described, for example, in EP 343 427 A2. Further suitable crosslinkers b) are pentaerythritol diallyl ether, pentaerythritol triallyl ether and pentaerythritol tetraallyl ether, polyethylene glycol diallyl ether, ethylene glycol diallyl ether, glycerol diallyl ether and glycerol triallyl ether, polyallyl ethers based on sorbitol, and ethoxylated variants thereof. In the process according to the invention, it is possible to use di(meth)acrylates of polyethylene glycols, the polyethylene glycol used having a molecular weight between 100 and 1000.

However, particularly advantageous crosslinkers b) are di- and triacrylates of 3- to 20-tuply ethoxylated glycerol, of 3- to 20-tuply ethoxylated trimethylolpropane, of 3- to 20-tuply ethoxylated trimethylolethane, in particular di- and triacrylates of 2- to 6-tuply ethoxylated glycerol or of 2- to 6-tuply ethoxylated trimethyldpropane, of 3-tuply propoxylated glycerol or of 3-tuply propoxylated trimethylolpropane, and also of 3-tuply mixed ethoxylated or propoxylated glycerol or of 3-tuply mixed ethoxylated or propoxylated trimethylolpropane, of 15-tuply ethoxylated glycerol or of 15-tuply ethoxylated trimethylolpropane, and also of at least 40-tuply ethoxylated glycerol, of at least 40-tuply ethoxylated trimethylolethane or of at least 40-tuply ethoxylated trimethylolpropane.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol.

The amount of crosslinker b) is preferably from 0.01 to 15% by weight, more preferably from 0.5 to 10% by weight, most preferably from 1 to 5% by weight, based in each case on the monomer solution.

Examples of ethylenically unsaturated monomers c) which are copolymerizable with the ethylenically unsaturated, acid-bearing monomers a) are acrylamide, methacrylamide, crotonamide, dimethylaminoethyl methacrylate, dimethylaminoethyl acrylate, dimethylaminopropyl acrylate, diethylaminopropyl acrylate, dimethylaminobutyl acrylate, dimethylaminoethyl methacrylate, diethylaminoethyl methacrylate, dimethylaminoneopentyl acrylate and dimethylaminoneopentyl methacrylate.

Useful water-soluble polymers d) include polyvinyl alcohol, polyvinylpyrrolidone, starch, starch derivatives, polyglycols or polyacrylic acids, preferably polyvinyl alcohol and starch.

For optimal action, the preferred polymerization inhibitors require dissolved oxygen. Therefore, the monomer solution can be freed of dissolved oxygen before the polymerization by inertization, i.e. flowing through with an inert gas, preferably nitrogen. The oxygen content of the monomer solution is preferably lowered before the polymerization to less than 1 ppm by weight, more preferably to less than 0.5 ppm by weight.

The preparation of a suitable polymer and also further suitable hydrophilic ethylenically unsaturated monomers a) are described in DE 199 41 423 A1, EP 686 650 A1, WO 2001/45758 A1 and WO 2003/104300 A1.

Suitable reactors are kneading reactors or belt reactors. In the kneader, the polymer gel formed in the polymerization of an aqueous monomer solution is comminuted continuously by, for example, contrarotatory stirrer shafts, as described in WO 2001/38402 A1. The polymerization on the belt is described, for example, in DE 38 25 366 A1 and U.S. Pat. No. 6,241,928. Polymerization in a belt reactor forms a polymer gel which has to be comminuted in a further process step, for example in a meat grinder, extruder or kneader.

Advantageously, the hydrogel, after leaving the polymerization reactor, is then stored, for example in insulated vessels, at elevated temperature, preferably at least 50° C., more preferably at least 70° C., most preferably at least 80° C., and preferably less than 100° C. The storage, typically for from 2 to 12 hours, further increases the monomer conversion.

In the case of relatively high monomer conversions in the polymerization reactor, the storage can also be shortened significantly or a storage can be dispensed with.

The acid groups of the resulting hydrogels have typically been partially neutralized, preferably to an extent of from 25 to 95 mol %, more preferably to an extent of from 50 to 80 mol % and even more preferably to an extent of from 60 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

Neutralization is preferably carried out at the monomer stage. It is done typically by mixing in the neutralizing agent as an aqueous solution, as a melt, or else preferably as a solid material. For example, sodium hydroxide having a water content of distinctly below 50% by weight can be present as a waxy mass having a melting point of above 23° C. In this case, metering as piece material or melt at elevated temperature is possible.

However, it is also possible to carry out neutralization after the polymerization, at the hydrogel stage. It is also possible to neutralize up to 40 mol %, preferably from 10 to 30 mol % and more preferably from 15 to 25 mol % of the acid groups before the polymerization by adding a portion of the neutralizing agent actually to the monomer solution and setting the desired final degree of neutralization only after the polymerization, at the hydrogel stage. When the hydrogel is neutralized at least partly after the polymerization, the hydrogel is preferably comminuted mechanically, for example by means of a meat grinder, in which case the neutralizing agent can be sprayed, sprinkled or poured on and then carefully mixed in. To this end, the gel mass obtained can be repeatedly ground in a meat grinder for homogenization.

The hydrogel is then preferably dried with a belt dryer until the residual moisture content is preferably below 15% by weight and especially below 10% by weight, the water content being determined by EDANA (European Disposables and Nonwovens Association) recommended test method No. WSP 230.2-05 "Moisture content". If desired, however, drying can also be carried out using a fluidized bed dryer or a heated plowshare mixer. To obtain particularly white products, it is advantageous to dry this gel while ensuring rapid removal of the evaporating water. To this end, the dryer temperature must be optimized, the air feed and removal has to be controlled, and sufficient venting must be ensured in each case. The higher the solids content of the gel, the simpler the drying, by its nature, and the whiter the product. The solids content of the gel before the drying is therefore preferably between 30% and 80% by weight. It is particularly advantageous to vent the dryer with nitrogen or another nonoxidizing inert gas. If desired, however, it is also possible simply just to lower the partial pressure of the oxygen during the drying in order to prevent oxidative yellowing processes.

Thereafter, the dried hydrogel is ground and classified, and the apparatus used for grinding may typically be single- or multistage roll mills, preferably two- or three-stage roll mills, pin mills, hammer mills or vibratory mills.

To further improve the properties, the polymer particles may be postcrosslinked. Suitable postcrosslinkers are compounds which comprise at least two groups which can form covalent bonds with the carboxylate groups of the hydrogel. Suitable compounds are, for example, alkoxysilyl compounds, polyaziridines, polyamines, polyamidoamines, di- or polyepoxides, as described in EP 83 022 A2, EP 543 303 A1 and EP 937 736 A2, di- or polyfunctional alcohols, as described in DE 33 14 019 A1, DE 35 23 617 A1 and EP 450 922 A2, or β-hydroxyalkylamides, as described in DE 102 04 938 A1 and U.S. Pat. No. 6,239,230.

Additionally described as suitable postcrosslinkers are cyclic carbonates in DE 40 20 780 C1, 2-oxazolidone and its derivatives, such as 2-hydroxyethyl-2-oxazolidone, in DE 198 07 502 A1, bis- and poly-2-oxazolidinones in DE 198 07 992 C1, 2-oxotetrahydro-1,3-oxazine and its derivatives in DE 198 54 573 A1, N-acyl-2-oxazolidones in DE 198 54 574 A1, cyclic ureas in DE 102 04 937 A1, bicyclic amide acetals in DE 103 34 584 A1, oxetanes and cyclic ureas in EP 1 199 327 A2 and morpholine-2,3-dione and its derivatives in WO 2003/31482 A1.

In addition, it is also possible to use postcrosslinkers which comprise additional polymerizable ethylenically unsaturated groups, as described in DE 37 13 601 A1.

The amount of postcrosslinker is preferably from 0.01 to 1% by weight, more preferably from 0.05 to 0.5% by weight, most preferably from 0.1 to 0.2% by weight, based in each case on the polymer.

In a preferred embodiment of the present invention, polyvalent cations are applied to the particle surface in addition to the postcrosslinkers.

The polyvalent cations usable in the process according to the invention are, for example, divalent cations such as the cations of zinc, magnesium, calcium and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate is preferred. Apart from metal salts, it is also possible to use polyamines as polyvalent cations.

The amount of polyvalent cation used is, for example, from 0.001 to 0.5% by weight, preferably from 0.005 to 0.2% by weight, more preferably from 0.02 to 0.1% by weight, based in each case on the polymer.

The postcrosslinking is typically performed in such a way that a solution of the postcrosslinker is sprayed onto the hydrogel or the dry polymer particles. After the spraying, the polymer particles coated with the postcrosslinker are dried thermally, and the postcrosslinking reaction can take place either before or during the drying.

The spraying of a solution of the postcrosslinker is preferably performed in mixers with moving mixing tools, such as screw mixers, paddle mixers, disk mixers, plowshare mixers and shovel mixers. Particular preference is given to horizontal mixers such as plowshare mixers and shovel mixers, very particular preference to vertical mixers. Suitable mixers are, for example, Lödige mixers, Bepex mixers, Nauta mixers, Processall mixers and Schugi mixers.

The thermal drying is preferably carried out in contact dryers, more preferably paddle dryers, most preferably disk dryers. Suitable dryers are, for example, Bepex dryers and Nara dryers. Moreover, it is also possible to use fluidized bed dryers.

The drying can be effected in the mixer itself, by heating the jacket or blowing in warm air. Equally suitable is a downstream dryer, for example a staged dryer, a rotary tube oven or a heatable screw. It is particularly advantageous to mix and dry in a fluidized bed dryer.

Preferred drying temperatures are in the range from 100 to 250° C., preferably from 120 to 220° C. and more preferably from 130 to 210° C. The preferred residence time at this temperature in the reaction mixer or dryer is preferably at least 10 minutes, more preferably at least 20 minutes, most preferably at least 30 minutes.

Subsequently, the postcrosslinked polymer can be classified again.

To further improve the properties, the postcrosslinked polymer particles can be coated. Suitable coatings for improving the acquisition behavior and the permeability (SFC) are, for example, inorganic inert substances, organic polymers, cationic polymers and di- or polyvalent metal cations. Suitable coatings for dust binding are, for example, polyols.

Suitable inorganic inert substances are silicates such as montmorillonite, kaolinite and talc, zeolites, activated carbons, polysilicic acids, magnesium carbonate, calcium carbonate, barium sulfate, aluminum oxide, titanium dioxide and iron(II) oxide. Preference is given to using polysilicic acids, which are divided between precipitated silicas and fumed silicas according to their mode of preparation. The two variants are commercially available under the names Silica FK, Sipernat®, Wessalon® (precipitated silicas) and Aerosil® (fumed silicas) respectively. The inorganic inert substances may be used as a dispersion in an aqueous or water-miscible dispersant or in substance.

The particulate solids to be used in accordance with the invention are preferably fumed silicas and/or precipitated silicas.

When the water-absorbing polymer particles are coated with an inorganic inert material, the amount of inorganic inert material used, based on the water-absorbing polymer particles, is preferably from 0.05 to 5% by weight, more preferably from 0.1 to 1.5% by weight, most preferably from 0.3 to 1% by weight.

Suitable organic materials are polyalkyl methacrylates or thermoplastics such as polyvinyl chloride.

Suitable cationic polymers are polyalkylenepolyamines, cationic derivatives of polyacrylamides, polyethyleneimines and polyquaternary amines.

Polyquaternary amines are, for example, condensation products of hexamethylenediamine, dimethylamine and epichlorohydrin, condensation products of dimethylamine and epichlorohydrin, copolymers of hydroxyethylcellulose and diallyldimethylammonium chloride, copolymers of acrylamide and a-methacryloyloxyethyltrimethylammonium chloride, condensation products of hydroxyethylcellulose, epichlorohydrin and trimethylamine, homopolymers of diallyldimethylammonium chloride and addition products of epichlorohydrin to amidoamines. In addition, polyquaternary amines can be obtained by reacting dimethyl sulfate with polymers such as polyethyleneimines, copolymers of vinylpyrrolidone and dimethylaminoethyl methacrylate or copolymers of ethyl methacrylate and diethylaminoethyl methacrylate. The polyquaternary amines are available within a wide molecular weight range.

However, it is also possible to generate the cationic polymers on the particle surface, either through reagents which can form a network with themselves, such as addition products of epichlorohydrin to polyamidoamines, or through the application of cationic polymers which can react with an added crosslinker, such as polyamines or polyimines in combination with polyepoxides, polyfunctional esters, polyfunctional acids or polyfunctional (meth)acrylates.

It is possible to use all polyfunctional amines having primary or secondary amino groups, such as polyethyleneimine, polyallylamine and polylysine. The liquid sprayed by the process according to the invention preferably comprises at least one polyamine, for example polyvinylamine.

The cationic polymers may be used as a solution in an aqueous or water-miscible solvent, as a dispersion in an aqueous or water-miscible dispersant or in substance.

When the water-absorbing polymer particles are coated with a cationic polymer, the use amount of cationic polymer based on the water-absorbing polymer particles is preferably from 0.1 to 15% by weight, more preferably from 0.5 to 10% by weight, most preferably from 1 to 5% by weight.

Suitable di- or polyvalent metal cations are $Mg^{2+}$, $Ca^{2+}$, $Al^{3+}$, $Sc^{3+}$, $Ti^{4+}$, $Mn^{2+}$, $Fe^{2+/3+}$, $Co^{2+}$, $Ni^{2+}$, $Cu^{+/2+}$, $Zn^{2+}$, $Y^{3+}$, $Zr^{4+}$, $Ag^+$, $La^{3+}$, $Ce^{4+}$, $Hf^{4+}$ and $Au^{+/3+}$; preferred metal cations are $Mg^{2+}$, $Ca^{2+}$, $Al^{3+}$, $Ti^{4+}$, $Zr^{4+}$ and $La^{3+}$; particularly preferred metal cations are $Al^{3+}$, $Ti^{4+}$ and $Zr^{4+}$. The metal cations may be used either alone or in a mixture with one another. Suitable metal salts of the metal cations mentioned are all of those which have a sufficient solubility in the solvent to be used. Particularly suitable metal salts have weakly complexing anions, such as chloride, nitrate and sulfate. The metal salts are preferably used as a solution. The solvents used for the metal salts may be water, alcohols, dimethylformamide, dimethyl sulfoxide and mixtures thereof. Particular preference is given to water and water/alcohol mixtures, such as water/methanol or water/propylene glycol.

When the water-absorbing polymer particles are coated with a polyvalent metal cation, the amount of polyvalent metal cation used, based on the water-absorbing polymer particles, is preferably from 0.05 to 5% by weight, more preferably from 0.1 to 1.5% by weight, most preferably from 0.3 to 1% by weight.

Particularly suitable polyols are polyethylene glycols having a molecular weight of from 400 to 20 000 g/mol, polyglycerol, 3- to 10β-tuply ethoxylated polyols, such as trimethylolpropane, glycerol, sorbitol and neopentyl glycol. Particularly suitable polyols are 7- to 20-tuply ethoxylated glycerol or trimethylolpropane, for example Polyol TP 70® (Perstorp AB, Perstorp, Sweden). The latter have the advantage in particular that they lower the surface tension of an aqueous extract of the water-absorbing polymer particles only insignificantly. The polyols are preferably used as a solution in aqueous or water-miscible solvents.

When the water-absorbing polymer particles are coated with a polyol, the use amount of polyol, based on the water-absorbing polymer particles, is preferably from 0.005 to 2% by weight, more preferably from 0.01 to 1% by weight, most preferably from 0.05 to 0.5% by weight.

The abovementioned coatings can, though, also be applied to polymer particles (base polymer) which have not been postcrosslinked.

The process according to the invention enables dust-free coating of water-absorbing polymer particles with particulate solids, especially finely divided silicon dioxide. Compared to the prior art, an increased deposition rate and hence a higher yield are achieved.

The process according to the invention enables the production of water-absorbing polymer particles with a particularly low tendency to form lumps (anticaking) and/or the use of significantly reduced amounts of the flow assistant, for example finely divided silicon dioxide.

The process according to the invention can also be combined advantageously with other coating processes. In the mixer used for the coating with particulate solids, preferably fumed silica and/or precipitated silica, it is also possible to perform additional coatings. The additional coatings may, for example, be applied as a solution or dispersion to the water-absorbing polymer particles. Advantageously, the coating with the particulate solids is performed last.

When such further coatings are performed in a continuous horizontal mixer, the residence time of the water-absorbing polymer particles before coating with the particulate solid is preferably from 50 to 90%, more preferably from 60 to 80%, most preferably from 70 to 75%, of the total residence time in the mixer.

The process according to the invention is insensitive to additional gas streams in the mixer, which occur, for example, when solutions and/or dispersions are introduced by means of two-substance nozzles or solvents evaporate.

The water-absorbing polymer particles obtainable by the process according to the invention have a centrifuge retention capacity (CRC) of typically at least 15 g/g, preferably at least 20 g/g, preferentially at least 22 g/g, more preferably at least 24 g/g, most preferably at least 26 g/g. The centrifuge retention capacity (CRC) of the water-absorbing polymer particles is typically less than 60 g/g.

The water-absorbing polymer particles obtainable by the process according to the invention have an absorbency under a load of 6.21 kPa (AUL0.9 psi) of typically at least 10 g/g, preferably at least 12 g/g, preferentially at least 14 g/g, more preferably at least 16 g/g, most preferably at least 18 g/g, and typically not more than 30 g/g.

The water-absorbing polymer particles obtainable by the process according to the invention have a saline flow conductivity (SFC) of typically at least $100 \times 10^{-7}$ cm$^3$ s/g, usually at least $200 \times 10^{-7}$ cm$^3$ s/g, preferably at least $300 \times 10^{-7}$ cm$^3$ s/g, preferentially at least $350 \times 10^{-7}$ cm$^3$ s/g, more preferably at least $400 \times 10^{-7}$ cm$^3$ s/g, most preferably at least $450 \times 10^{-7}$ cm$^3$ s/g, and typically not more than $700 \times 10^{-7}$ cm$^3$ s/g.

The water-absorbing polymer particles are tested by the test methods described below.

Methods:

The measurements should, unless stated otherwise, be performed at an ambient temperature of 23±2° C. and a relative air humidity of 50±10%. The water-absorbing polymer particles are mixed thoroughly before the measurement.

Particle Size Distribution (PSD)

The particle size distribution of the water-absorbing polymer particles is determined analogously to the EDANA (European Disposables and Nonwovens Association) recommended test method No. WSP 220.2-05 "Particle size distribution".

Centrifuge Retention Capacity (CRC)

The centrifuge retention capacity is determined analogously to the EDANA (European Disposables and Nonwovens Association) recommended test method No. WSP 241.2-05 "Centrifuge retention capacity", the water-absorbing polymer particles being screened before the measurement to the particle size range from greater than 300 to 600 µm.

Absorbency Under Load (AUL0.9 psi)

The absorbency under a load of 6.21 kPa (0.9 psi) of the water-absorbing polymer particles is determined analogously to the EDANA (European Disposables and Nonwovens Association) recommended test method No. WSP 242.2-05 "Absorption under pressure", using 0.16 g of water-absorbing polymer particles with a particle size range of from greater than 300 to 600 µm instead of 0.9 g of water-absorbing polymer particles, using a wire mesh with a mesh width of 149 µm instead of a mesh width of 36 µm as the base plate and using a weight of 63 g/cm$^2$ (0.9 psi) instead of a weight of 21 g/cm$^2$ (0.3 psi).

Extractables 16h

The content of extractable constituents in the water-absorbing polymer particles is determined by the EDANA (European Disposables and Nonwovens Association) recommended test method No. WSP 270.2-05 "Extractables".

Saline Flow Conductivity (SFC)

The saline flow conductivity of a swollen gel layer under a pressure of 21 g/cm$^2$ (0.3 psi) is, as described in EP 0 640 330 A1, determined as the gel layer permeability of a swollen gel layer of water-absorbing polymer particles, except that the apparatus described in the aforementioned patent application on page 19 and in FIG. 8 has been modified to the effect that the glass frit (40) is not used, the die (39) consists of the same polymer material as the cylinder (37) and now comprises 21 bores of equal size distributed uniformly over the entire contact surface. The procedure and evaluation of the measurement remain unchanged from EP 0 640 330 A1. The flow rate is recorded automatically.

The saline flow conductivity (SFC) is calculated as follows:

$$\text{SFC [cm}^3\text{ s/g]} = (Fg(t=0) \times L0)/(d \times A \times WP),$$

where $Fg(t=0)$ is the flow rate of NaCl solution in g/s, which is obtained by means of a linear regression analysis of the $Fg(t)$ data of the flow determinations by extrapolation to $t=0$. L0 is the thickness of the gel layer in cm, d is the density of the NaCl solution in g/cm$^3$, A is the area of the gel layer in cm$^2$ and WP is the hydrostatic pressure over the gel layer in dyn/cm$^2$.

Anticaking

The anticaking is determined by the method described in WO 00/10619 A1 on page 22 line 11 to page 24 line 6.

Dust in Waste Air

The dust content in the waste air is assessed visually as follows:

○=no dust nuisance of the waste air
+=perceptible dust nuisance of the waste air
++=significant dust nuisance of the waste air The EDANA test methods are obtainable, for example, from European Disposables and Nonwovens Association, Avenue Eugene Plasky 157, B-1030 Brussels, Belgium.

EXAMPLES

The examples were performed with commercial water-absorbing polymer particles based on sodium acrylate.

Such water-absorbing polymer particles are commercially available, for example, from BASF Aktiengesellschaft (trade name HySorb®), from Stockhausen GmbH (trade name Favor®) and from Nippon Shokubai Co., Ltd. (trade name Aqualic®).

The water-absorbing polymer particles used had the following property profile:

| | |
|---|---|
| CRC: | 26.5 g/g |
| AUL0.9 psi: | 21 g/g |
| SFC: | $120 \times 10^{-7}$ cm$^3$s/g |
| Extractables 16 h: | 7.8% by weight |
| PSD: >850 µm | 0.7% by weight |
| 600-850 µm | 31.3% by weight |
| 300-600 µm | 50.5% by weight |
| 90-300 µm | 17.3% by weight |
| <90 µm | 0.2% by weight |

Example 1

The water-absorbing polymer particles were coated in a Ruberg DLM 350-1500 continuous flow mixer (Gebrüder Ruberg GmbH & Co KG, Nieheim, Germany) by means of an annular gap injector with 0.3% by weight of Sipernat® D17 (Degussa GmbH, Düsseldorf, Germany). Sipernat® D17 is a hydrophobized precipitated silica.

The continuous flow mixer had a mixing chamber volume of 140 l. The fill level of the continuous flow mixer was 60% and the speed was 43 min$^{-1}$. The Froude number of the moving water-absorbing polymer particles was 0.36.

The annular gap injector consisted of an inner tube with a diameter of 8 mm. 0.49 kg/h of Sipernat® D17 was metered in through the inner tube. The inner tube surrounded an adjustable annular gap. 5 kg/h of air (dispersion gas) were supplied through the annular gap. The initial pressure of the dispersion gas was 0.5 bar. The dispersion gas was accelerated through the annular gap and a reduced pressure was generated. As a result of the reduced pressure, air (bypass gas) and Sipernat® D17 were sucked in through the inner tube and dispersed in the air stream. The dispersed Sipernat® D17 was conducted into the flow mixer in cocurrent to the direction of rotation by means of a tube (lance) having an internal diameter of 8 mm.

The distance of the lance from the end wall of the continuous flow mixer was 1125 mm and the horizontal distance of the lance mouth from the mixer wall was 50 mm. The lance was installed vertically. The lance was inserted vertically from the top into the continuous mixer and ended 100 mm below the moving product bed surface.

The residence time of the water-absorbing polymer particles in the mixer was 20 minutes. The temperature of the water-absorbing polymer particles was 60° C.

The continuous flow mixer was operated without disruption for several hours.

The coated water-absorbing polymer particles were analyzed. The results are compiled in Table 1.

Example 2 (Comparative Example)

The procedure of Example 1 was repeated. Sipernat® D17 was dispersed by means of the annular gap injector. The lance was inserted vertically from the top into the continuous mixer and ended above the moving product bed surface.

The continuous flow mixer was operated without disruption for several hours.

The coated water-absorbing polymer particles were analyzed. The results are compiled in Table 1.

Example 3 (Comparative Example)

The procedure of Example 1 was repeated. Sipernat® D17 was metered in via a tube having an internal diameter of 8 mm. The tube ended 100 mm below the moving product bed surface.

It was not possible to meter in the desired amount of Sipernat® D17.

Example 4 (Comparative Example)

The procedure of Example 1 was repeated. Sipernat® D17 was metered in via a tube having an internal diameter of 8 mm. The tube ended above the moving product bed surface.

The continuous flow mixer was operated without disruption for several hours.

The coated water-absorbing polymer particles were analyzed. The results are compiled in Table 1.

TABLE 1

| | Results | |
|---|---|---|
| Example | Anticaking | Dust in waste air |
| 1 | 89% | ○ |
| 2*) | 35% | ++ |
| 3*) | —) | —) |
| 4*) | 54% | + |

*)comparative example
**)not determined

The invention claimed is:

1. A process for producing water-absorbing polymer particles comprising (i) polymerizing a monomer solution or suspension comprising
   a) at least one ethylenically unsaturated acid-bearing monomer which may be at least partly neutralized,
   b) at least one crosslinker,
   c) optionally one or more ethylenically and/or allylically unsaturated monomer copolymerizable with the monomer specified under a), and
   d) optionally one or more water-soluble polymer,
(ii) drying, grinding, and classifying the polymer resulting from (i) to provide water-absorbing polymer particles, and
   (iii) coating the water-absorbing polymer particles with a particulate solid in a mixer, wherein the particulate solid is dispersed by means of a gas stream and a supply tube for the dispersed particulate solid in the mixer ends below a product bed surface.

2. The process according to claim 1, which comprises at least one postcrosslinking.

3. The process according to claim 2, wherein the postcrosslinked polymer particles are coated with the particulate solid.

4. The process according to claim 1, wherein a ratio of mass flow rate of particulate solid to dispersion gas mass flow rate is at least 0.05.

5. The process according to claim 1, wherein the water-absorbing polymer particles have a mean particle diameter of at least 200 μm.

6. The process according to claim 1, wherein the particulate solid has a mean diameter of less than 50 μm.

7. The process according to claim 1, wherein the supply tube has a circular cross section.

8. The process according to claim 1, wherein a continuous mixer is used.

9. The process according to claim 1, wherein a fill level in the mixer is from 30 to 80%.

10. The process according to claim 1, wherein the water-absorbing polymer particles fed to the mixer have a water content of less than 20% by weight.

11. The process according to claim 1, wherein the water-absorbing polymer particles fed to the mixer have a temperature of from 40 to 80° C.

12. The process according to claim 1, wherein the particulate solid is dispersed by means of an annular gap injector.

13. The process according to claim 12, wherein a pressure drop of the dispersion gas in the annular gap injector is at least 0.5 bar.

14. The process according to claim 1, wherein the mixer is a horizontal mixer.

15. The process according to claim 14, wherein a residence time of the water-absorbing polymer particles in the horizontal mixer is from 1 to 180 minutes.

16. The process according to claim 14, wherein a peripheral speed of the mixing tools in the horizontal mixer is from 0.1 to 10 m/s.

17. The process according to claim 14, wherein the water-absorbing polymer particles are moved in the horizontal mixer with a speed which corresponds to a Froude number of from 0.01 to 6.

18. The process according to claim 14, wherein the dispersed particulate solid is supplied cocurrent to a direction of rotation of the horizontal mixer.

19. The process according to claim 1, wherein the particulate solid is fumed silica and/or precipitated silica.

20. The process according to claim 1, wherein the water-absorbing polymer particles have a centrifuge retention capacity of at least 15 g/g.

* * * * *